March 14, 1950     J. C. HEWITT, JR     2,500,411
INSTRUMENT FLOAT CONTROL
Filed May 3, 1948
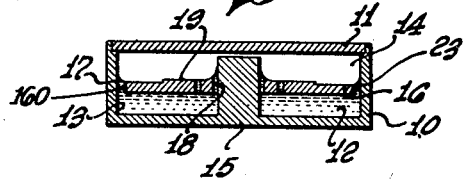
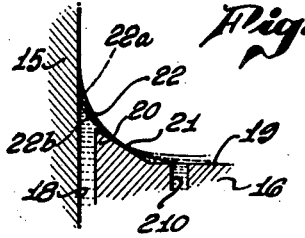
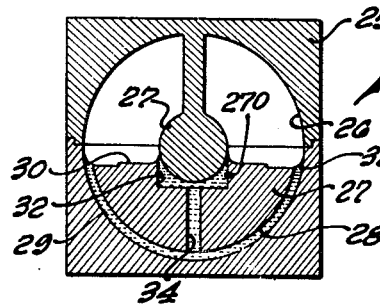
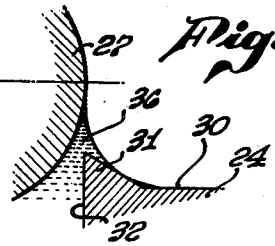
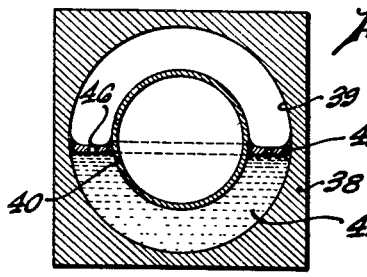
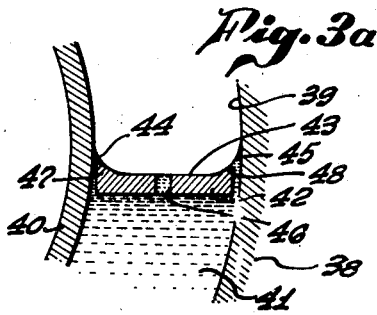
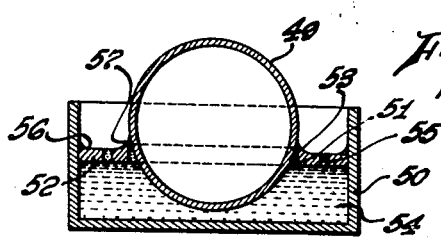
INVENTOR.
JOHN C. HEWITT, JR.,
BY
ATTORNEY.

Patented Mar. 14, 1950

2,500,411

UNITED STATES PATENT OFFICE 2,500,411

INSTRUMENT FLOAT CONTROL

John C. Hewitt, Jr., Long Beach, Calif.

Application May 3, 1948, Serial No. 24,761

9 Claims. (Cl. 33—206)

This invention has to do with float instruments, generally of the type comprising a liquid floated part, the particular functions of which may depend upon the nature and functions of individual adaptations of the instrument. Particularly the invention is concerned with the maintenance of the float in accurately centered relation to its chamber and in a condition of free mobility in response to changing conditions affecting the float. Specifically the invention is directed to improvements in the subject matter of my copending application Serial Number 774,390, filed September 16, 1947, on Instrument float.

In common with the invention disclosed in said copending application, the present invention has for its general object to provide for frictionless and consistent centering of the float by utilizing the properties and form of the liquid itself, and to the complete elimination of the usual friction creating guides and centering devices. More particularly the invention contemplates the formation of an annular liquid meniscus, or a plurality of menisci, and utilizing the meniscus to control the float position.

With reference to the form and location of the meniscus, the invention contemplates arrangement of the float part and an associated centering or guide part, in such relation as to form between the parts an annular upwardly and inwardly curved meniscus of the liquid, which confines or holds the float in centered condition, while otherwise giving the float full capacity for change of position. Such relation of the parts and meniscus formation may be accomplished by providing one part with a circular opening receiving a circular surface on the other part and between which the liquid meniscus is formed. By submerging one of the parts beneath the liquid surface adjacent the meniscus, an unvariable centered condition of the float becomes established by the indestructibility of the meniscus and its confining relation to the float.

In arriving at such association of the float, liquid and centering part, consideration is given the wettability of the submerged part by the liquid, the relative densities of the liquid and float, and particular shape characteristics of the meniscus engaging portion of the submerged part, all as will later develop.

A further important feature and object of the invention is the compensation for changes in the relative specific gravities of the float and liquid, resulting for example from heating of the liquid, in a manner permitting maintenance of the float without appreciable or consequential change in its elevation within the float chamber. Generally speaking, this object is accomplished by shaping the liquid meniscus engaging surface of the float in a manner such that although the meniscus curvature may vary considerably as the surface tension of the liquid changes (as due to temperature variations), the float elevation will remain substantially unchanged.

The invention has various additional features and objects, the particular nature and significance of which can be explained to best advantage by describing certain illustrative embodiments as shown by the accompanying drawing, in which:

Fig. 1 is a view showing one embodiment of the invention in vertical section;

Fig. 1a is a fragmentary enlargement showing the float and meniscus relation adjacent the central guide;

Figs. 2 and 2a are views similar respectively to Figs. 1 and 1a, illustrating a variational embodiment of the invention;

Fig. 3 illustrates in vertical section a further embodiment of the invention;

Fig. 3a is a fragmentary enlargement of the guide float and associated meniscus formation; and Fig. 4 is a view similar to Fig. 3 illustrating a modification of that form.

As will be understood, the float element in all the illustrated forms of the invention, may be used to serve any desired purpose, such as for example to carry a compass needle having extreme sensitivity by reason of the capacity of the float for unrestrained movement. Referring first to Figs. 1 and 1a, as used typically for a compass, the transparent container 10 having a cover 11, may be formed of material such as glass or clear organic plastic wettable by the contained liquid 12, the container having an inner cylindrical surface 13. The float chamber 14 accommodates a central guide 15, typically in the form of a cylindrical projection formed integrally with the bottom 15 of the container. The float 16 is shown to have the form of a central disc having rather narrow clearance at 17 from the container wall. The float has a central circular opening 18 slightly larger than the guide 15, the float thus being freely movable, under the later described meniscus control, without contacting either the chamber wall or guide surface.

To cite a specific construction as illustrative, the container 10 may have an internal diameter of about $1\tfrac{1}{16}$ inches and the float an outside diameter of about 1 inch. The diameter of the guide 15 may be in the order of about ¼ inch, with opening 18 having a diameter of about 1/8 inch. The float 16 may be made of any suitable material, such as clear organic plastic, wettable by a liquid 12 such as perchlorethylene, or any other suitable liquid having proper specific gravity relation to the float. Generally speaking, the float material and liquid may be selected with relation to their specific gravities, so that the float will remain immediately below or adjacent the liquid surface, and therefore in condition such that the float is confined and centered by the liquid meniscus. Assuming the liquid to be perchlorethylene having a specific gravity of about 1.6, the float material may be selected to have a specific gravity of about 1.2 to 1.5.

Referring further to the float 16, its entire top surface may be continuously planar, or annularly stepped formation as shown in Fig. 1, where the float appears to have an inner annular raised surface portion 19. Referring to Fig. 1a, the inner edge of the float adjacent the guide 15 has an upstanding annular rim 20, the inside surface of which forms a continuation of the cylindrical opening 18, the outer surface 21 of the rim being downwardly and outwardly inclined, substantially as illustrated.

Although of lesser specific gravity than the liquid, the float is maintained by reason of the surface tension of the liquid, submerged in the liquid to the extent that the latter films the top surface of the float. About the guide 15, the liquid forms an upwardly and inwardly curved meniscus 22 which immediately overlies the rim 20. At the outer periphery of the float the liquid forms an upwardly curved meniscus 23 at the cylindrical chamber wall 17. By virtue of the relationship shown in Fig. 1a the float rim 20 is caused to engage the curved extent of the meniscus 22 so that the meniscus both centers and confines the float against lateral displacement. Thus the meniscus curvature and surface tension of the liquid establish an annular barrier or a buffer assuring maintenance of the float in centered position within the chamber, while otherwise permitting the float complete freedom of movement in the liquid.

Figs. 2 and 2a illustrate a variational form of the invention in which the float 24 is centered within its container 25 having a spherical chamber wall 26, the float being centered by reason of the meniscus relation with a relatively stationary spherical guide 27 formed integrally with the container. The float 24 has a segmental spherical bottom surface 28 clearing the chamber wall 26 at 29, the top surface 30 of the float having the illustrated annular stepped formation with an inner upstanding annular rim 31 similar to rim 20 previously described with reference to Fig. 1a. The float has a central cylindrical recess 32 within which the lower portion of the guide 27 depends, the recess being liquid filled and communicated through passage 34 through the bottom of the float. As before, the float, though of less specific gravity than the liquid, is maintained in centered relation within the chamber 26 and about the guide 27, by reason of the float submergence in the liquid and engagement of its rim 31 with the annular meniscus 36 extending upwardly and inwardly from the liquid film overlying the top surface of the float, to the cylindrical surface of the guide 27. At the outside of the float, the liquid continues from the surface film as an upwardly and outwardly curved meniscus 37 adjacent the spherical chamber wall.

In Figs. 3 and 3a, the container 38 is shown to have a spherical chamber 39 containing a spherical float 40 which is submerged in the liquid 41 to a depth somewhat below, and preferably not above, the horizontal equator of the float. As in the case of all the described forms, the float and chamber wall are wettable by the liquid. The float is concentrically positioned and maintained within the chamber by an annular guide float 42 which may have the same specific gravity relation to the liquid 41, as that previously described with reference to the float and liquid in Fig. 1. Thus the top surface 43 of the guide is filmed over by the liquid which forms an upwardly and inwardly curved annular meniscus 44 between the inner edge of the guide and float 40, the liquid forming an upwardly and outwardly curved annular meniscus 45 between the guide periphery and the spherical chamber wall 39. The liquid is accessible to the top surface of the guide intermediate its edges, through openings 46. The guide 42 has inner and outer upstanding rims 47 and 48 which, by reason of their confined engagement with the menisci 44 and 45, center the guide relative to the float chamber, and against engagement with the central float and chamber wall. It may be mentioned that either the float 40 or the guide 42, by reason of their capacity for free mobility in the liquid, may be adapted to carry a compass needle or serve other desired functions of a float element.

According to the form of the invention shown in Fig. 4, the float 49 is centered within its container 50 within the concentric opening 51 in an annular guide flange 52 formed integrally with the chamber and having an upstanding inner rim 53 extending in narrowly spaced relation about the float. Here the liquid 54, accessible to the guide surface through openings 55, films the top surface 56 of the guide and forms over the top surface of the rim 53 an upwardly and inwardly curved annular meniscus 57 adhering to and centering the float.

Reference has been made to the desirability for maintaining substantially constant the float elevation in the chamber, despite changes in the density of the liquid and therefore relative densities of the float and liquid affecting the buoyancy of the latter. Assuming for example an increase of the liquid temperature, a two-fold effect generally occurs in that the liquid tends to separate, with resultant decrease of specific gravity, and the meniscus tends to assume a sharper curvature, or a curvature confined more closely to the stationary guide wall. As the liquid temperature decreases the float tends to rise by reason of both the liquid expansion and increasing specific gravity differential. The invention contemplates compensating for such conditions, in a manner that will assure substantially constant elevation of the float in the chamber. The manner of accomplishing this purpose is illustrated in Fig. 1a, although it is to be understood that the same conditions and relationship between an edge or rim portion of the float and the liquid meniscus adjacent a stationary surface, whether of a central guide or the outer chamber wall itself, may exist with respect to all the illustrated forms of the invention.

Referring to Fig. 1a as illustrative, as the liquid temperature increases and the density of the liquid decreases, the meniscus curvature tends to increase and to approach more closely the surface of the guide 15, as illustrated by the dot-dash and dotted curves 22a and 22b. Now it will be noted that the float rim surface 21 has such angularity that normally its circular line of contact with the meniscus 22 is at a location intermediate the upper and lower ends of the surface. In any given instance the slope of surface 21 may be made to satisfy this condition in accordance with such considerations as the normal or average meniscus curvature for any certain liquid. As the meniscus curvature changes, as progressively through the shapes 22a and 22b, the meniscus still is contacted by surface 21 at locations intermediate its upper and lower extremities, and due to the slope of the surface, such contact is maintained without any appreciable or consequential change of the float position vertically in its chamber. As illustrated, the liquid may be accessible through an opening 210 to the top surface of the float adjacent the meniscus. Radially outward beyond the meniscus the float surface may be filmed with the liquid, or it may be substantially dry.

In the foregoing, reference has been had to the float centering function of the meniscus in serving as a rim-engaged buffer or barrier resisting lateral displacement of the float. The meniscus may have an additional float centering effect by reason of its tensional resistance to displacement of the float away from the part of the surface between which and the float the meniscus extends. For example, displacement of the float in Fig. 1 toward the right may cause, depending upon the degree of such displacement, the rim 20 to apply tension to that portion of the meniscus 22 extending from the edge of the rim to the surface of the guide 15. The tendency of the meniscus, by virtue of the surface tension of the liquid, is to pull the float back toward centered position. At the opposite side of the guide 15, the rim 20 may tend to move away from or further inwardly beneath the meniscus, or at least in a relation thereto such that any restoring influence imposed by the meniscus to the float movement is lessened. The result is, therefore that the portion of the meniscus placed under tension pulls the float back to a centered position in which the float rim and meniscus have restored to a force equilibrium. The same applies throughout the various embodiments shown, since where in any instance a float part normally centered with relation to a spaced adjacent part by a meniscus extending between them tends to shift out of centered relation so that at one side the rim-to-opposed wall meniscus is placed under tension, the resulting tendency of the meniscus so deformed or tensioned, is to pull the float back to centered position.

As will be understood, the float elements in each of the illustrated forms may serve any of the purposes for which instrument floats are adaptable. For example, as a compass float, the float 16 in Fig. 1 may carry a suitable magnetic pole-seeking element, such as a ring 160 having diametrically opposed portions of opposite polarity. The float 24 in Fig. 2 may carry a similar ring 270 within its recess 32.

I claim:

1. A float instrument containing a body of liquid and comprising a circular float part floated by the liquid, a second part having a circular surface substantially concentric with and spaced from the float, one of said parts being surrounded by the other part, said liquid forming between the float and said surface an annular meniscus curved upwardly and inwardly toward the vertical axis of the parts, the outer part having an upstanding annular projection the top of which is submerged in the liquid at the location of the meniscus so that the meniscus extends upwardly and inwardly from said projection to the inner part to maintain the parts in said spaced concentric relation.

2. A float instrument containing a body of liquid and comprising a circular float part floated by the liquid, a second part having a circular surface substantially concentric with and spaced from the float, one of said parts being surrounded by the other part, said liquid forming between the float and said surface an annular meniscus curved upwardly and inwardly toward the vertical axis of the parts, the outer part having an upstanding annular rim wettable by the liquid, said rim having a top narrow edge at the location of the meniscus so that the meniscus extends upwardly and inwardly from said edge to the inner part to maintain the parts in said spaced concentric relation.

3. A float instrument containing a body of liquid and comprising a circular float part floated by the liquid, a second part having a circular surface substantially concentric with and spaced from the float, one of said parts being surrounded by the other part, said liquid forming between the float and said surface an annular meniscus curved upwardly and inwardly toward the vertical axis of the parts, both of said parts being wettable by the liquid and the outer part having an upstanding annular projection submerged in the liquid and engaging upwardly against the convex under side of the meniscus to maintain the parts in said spaced concentric relation.

4. A float instrument containing a body of liquid and comprising a float part floated by the liquid and submerged substantially entirely below the surface of the liquid, a second part having a circular surface substantially concentric with and spaced from the float, one of said parts being surrounded by the other part, said liquid forming between the float and said surface an annular meniscus curved upwardly and inwardly toward the vertical axis of the parts, the outer part having an upstanding annular projection the top of which is submerged in the liquid at the location of the meniscus so that the meniscus extends upwardly and inwardly from said projection to the inner part to maintain the parts in said spaced concentric relation.

5. A float instrument containing a body of liquid and comprising a stationary centering part having a circular surface wetted by the liquid, a float part surrounding and annularly spaced from said surface, said liquid forming between the float and said surface an upwardly curved meniscus, and an upstanding annular projection carried by the float part at the location of the meniscus so that the meniscus extends upwardly and inwardly from said projection to maintain the part in said spaced concentric relation.

6. A float instrument containing a body of liquid and comprising a stationary centering part having a circular surface wetted by the liquid, a float part surrounding and annularly spaced from said surface, said liquid forming between the float and said surface an upwardly curved meniscus, and an upstanding annular projection carried by the float part at the location of the meniscus, said float having a substantially horizontal surface surrounding said annular projection and the meniscus extending upwardly and inwardly from said horizontal surface so that the meniscus is engageable by said projection and the parts are maintained by the meniscus in said spaced concentric relation.

7. A float instrument comprising a chamber containing a body of liquid, a stationary centering part projecting from the wall of said chamber vertically and centrally therein and having a circular surface wetted by the liquid, a float part surrounding and annularly spaced from said surface, said liquid forming between the float and said surface an upwardly curved meniscus, and an upstanding annular projection carried by the float part at the location of the meniscus so that the meniscus extends upwardly and inwardly from said projection to maintain the parts in said spaced concentric relation.

8. A float instrument containing a body of liquid and comprising a circular float part floated by the liquid, a second part having a circular surface substantially concentric with and spaced from the float, one of said parts being surrounded by the other part, said liquid forming between the float and said surface an annular meniscus curved upwardly and inwardly toward the vertical axis of the parts, the outer part having an upstanding annular projection the top of which is submerged in the liquid at the location of the meniscus so that the meniscus extends upwardly and inwardly from said projection to the inner part to maintain the parts in said spaced concentric relation, one of said parts containing an internal opening through which said liquid is accessible to the top surface thereof.

9. A float instrument comprising a circular cross section chamber containing a body of liquid, an annular float part floated by the liquid, a second part having a circular surface surrounded by the float in substantially concentric spaced relation, said liquid forming between the float and said surface an annular inner meniscus curved upwardly and inwardly toward the vertical axis of the parts and an annular outer meniscus curved upwardly and outwardly from the float part to the chamber wall, and a pair of upstanding concentric annular inner and outer projections carried by the float, the tops of said projections being submerged in the liquid at the location of said meniscus so that said inner meniscus extends upwardly and inwardly from said inner projection to the surface of said second part and the outer meniscus extends upwardly and outwardly from said outer projection to the chamber wall.

JOHN C. HEWITT, Jr.

REFERENCES CITED

The following references are of record in the file of this patent:

UNITED STATES PATENTS

| Number | Name | Date |
| --- | --- | --- |
| 1,054,495 | Benson | Feb. 25, 1913 |
| 1,754,055 | Senter | Apr. 8, 1930 |
| 1,912,358 | Bush | June 6, 1933 |
| 1,987,696 | McLaughlin et al. | Jan. 15, 1935 |
| 2,169,342 | Hewitt, Jr., et al. | Aug. 15, 1939 |
| 2,432,875 | Flint | Dec. 16, 1947 |

FOREIGN PATENTS

| Number | Country | Date |
| --- | --- | --- |
| 128,959 | Germany | 1900 |